June 3, 1958     M. FRACHON     2,837,397
MULTIPLE RECORDING APPARATUS
Filed March 23, 1955     3 Sheets-Sheet 1
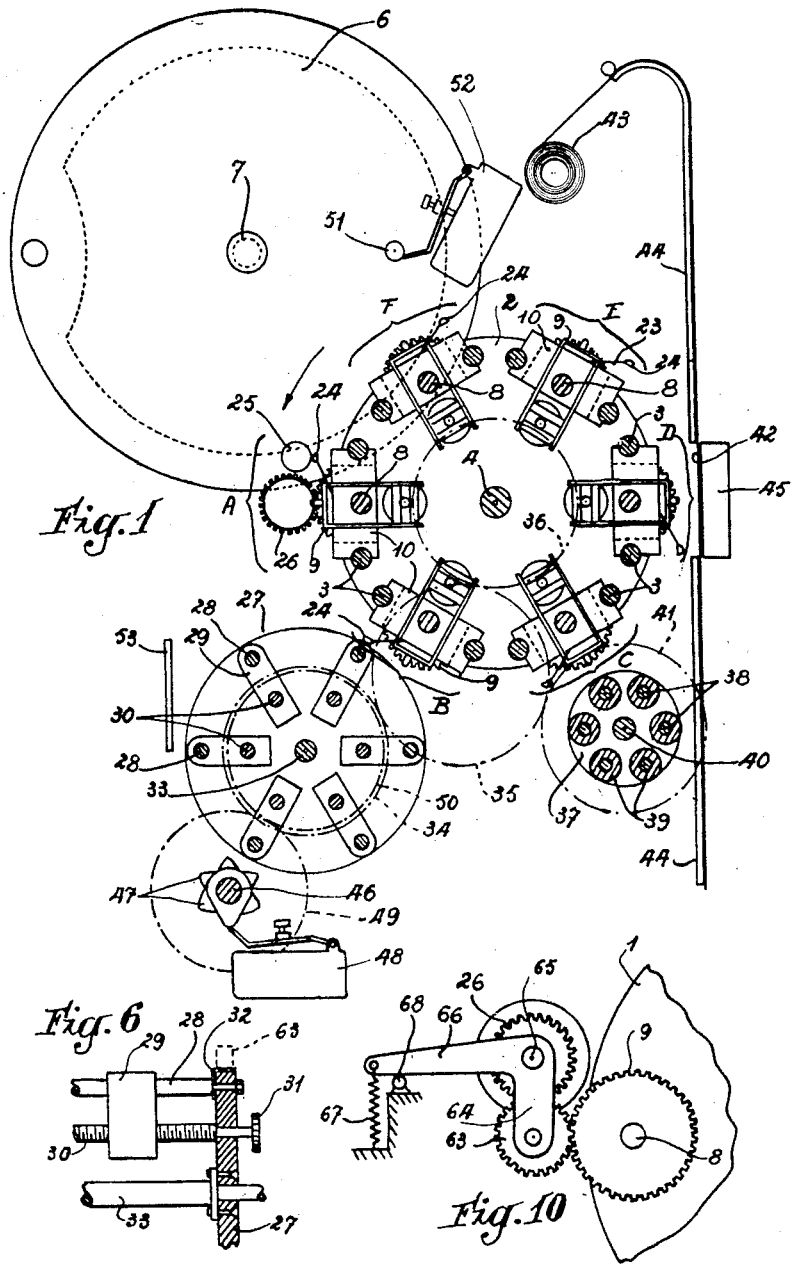
INVENTOR.
Marc Frachon
BY
ATTORNEYS

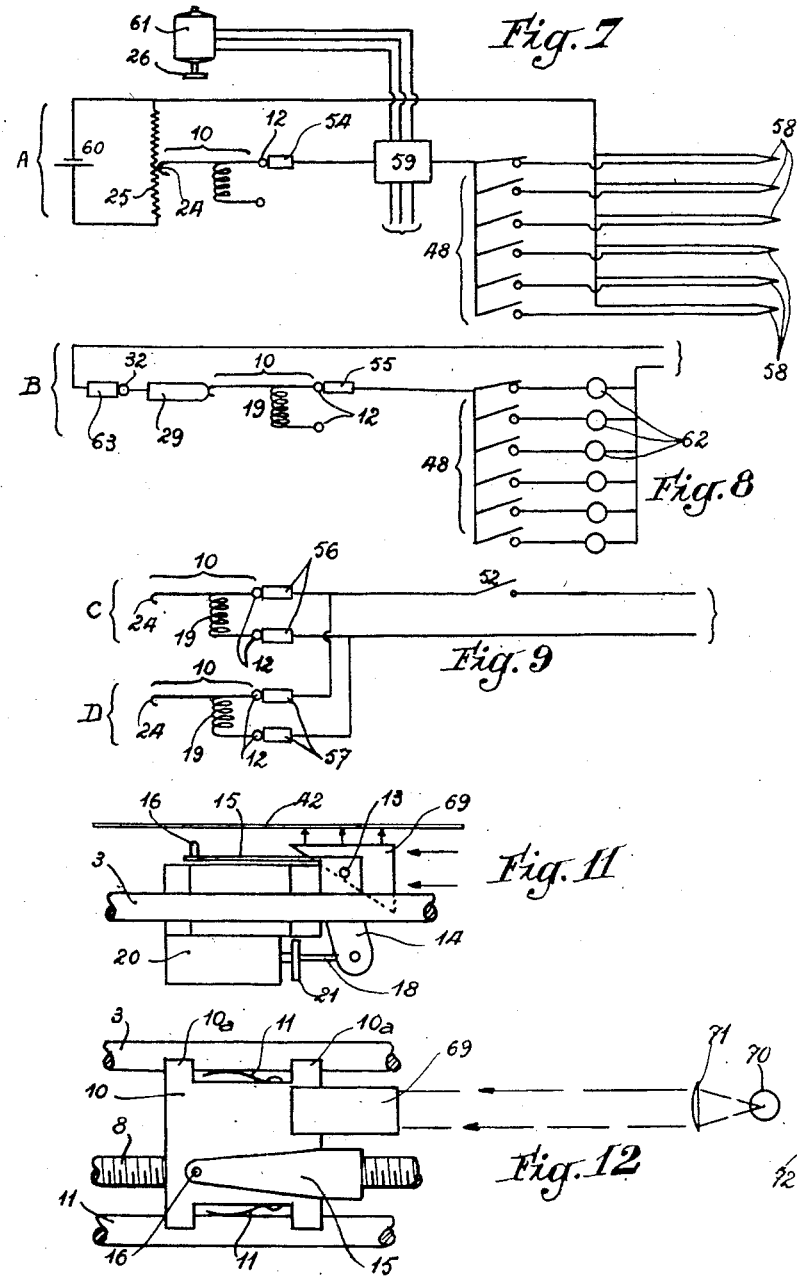

June 3, 1958  M. FRACHON  2,837,397
MULTIPLE RECORDING APPARATUS
Filed March 23, 1955  3 Sheets-Sheet 3
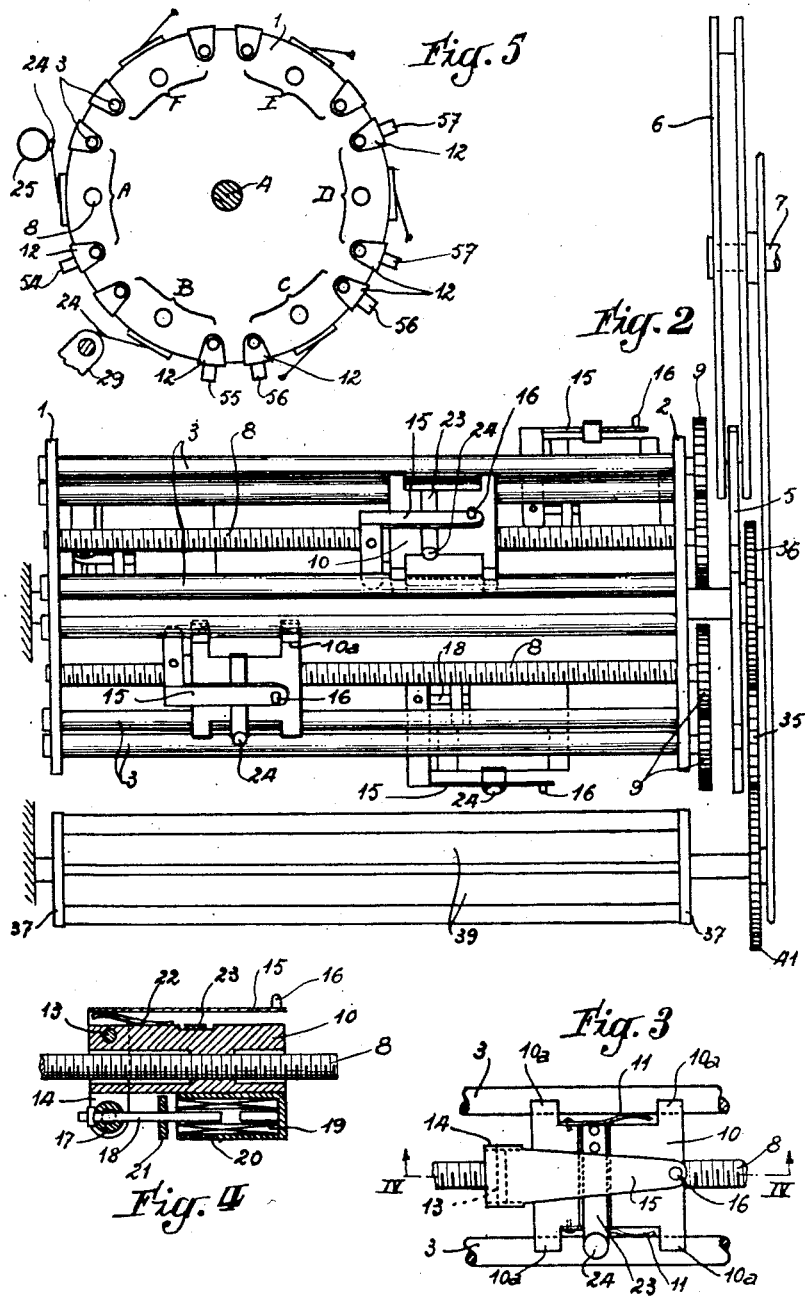
INVENTOR.
Marc Frachon
BY
ATTORNEYS United States Patent Office 2,837,397
Patented June 3, 1958

2,837,397

MULTIPLE RECORDING APPARATUS

Marc Frachon, Saint-Genis-Laval, France, assignor to "C. O. R. E. C. I. Compagnie de Regulation et de Control Industriel," Lyon, France, a French limited liability company Application March 23, 1955, Serial No. 496,301

Claims priority, application France March 24, 1954

9 Claims. (Cl. 346—46)

My invention relates to an apparatus adapted to record the values of a plurality of magnitudes on the same chart.

It has been proposed to record the values of a plurality of magnitudes on the same chart by means of a plurality of carriages movable across the chart, each carriage being under control of the measuring instrument corresponding to a magnitude. There is thus obtained on the chart a number of successive curves, each corresponding to a given magnitude. But with such an arrangement it is impossible to obtain that each curve extends over the whole width of the chart with all the curves exactly having the same abscissae.

It has also been proposed to record the values of a number of magnitudes by means of a single carriage successively controlled by the measuring instruments of the said magnitudes, this carriage being adapted to print a dot each time it has been positioned across the chart. With such an arrangement the curves are recorded as a series of successive dots in the same colour for all the curves. The length of time provided between two successive printing steps should be long enough to permit an eventual displacement of the carriage from one edge of the chart to the other and consequently the distance between the successive dots of a given curve are relatively great.

A first object of my invention is to provide a multiple recording apparatus wherein the curves may be recorded in different colours, and wherein each individual curve may extend over the whole width of the chart, all the curves having the same abscissae.

Another object of my invention is to provide a multiple recording apparatus wherein the curves are printed in the form of a relatively close series of successive dots.

Still another object of my invention is to provide a multiple recording apparatus having a plurality of recording carriages displaceable on a movable support in such a manner that the position of each carriage on the support may correspond to the value of a magnitude and that the carriages thus positioned on the support may successively come to operative position with respect to the chart to print a dot thereon.

In the accompanying drawings:

Fig. 1 is a general transverse section of an apparatus according to my invention.

Fig. 2 shows a projection of this apparatus on the plane determined by the axis of the main revolving support and of the auxiliary inking revolving support, the chart and its support being supposedly removed.

Fig. 3 is an enlarged view of an individual recording carriage.

Fig. 4 is a section thereof taken along line IV—IV (Fig. 3).

Fig. 5 is an end view of the main revolving support.

Fig. 6 is a large scale fragmental section of the auxiliary revolving support which carries the adjustable contacts.

Fig. 7 is an electric diagram corresponding to one of the individual recording carriages, the latter being supposedly at the position for which it is under control of the measuring apparatus.

Fig. 8 is a view similar to Fig. 7, but the carriage being in front of the auxiliary support which carries the adjustable contacts.

Fig. 9 is a similar diagram showing two successive individual carriages at the two positions following that of Fig. 8.

Fig. 10 indicates a modification in the arrangement of the connection between the successive carriages and the driving motor carried by the frame of the apparatus.

Figs. 11 and 12 illustrate an optic indicator showing the position of the carriages when the latter are at the printing position.

The apparatus illustrated comprises a main support formed of two cheeks 1 and 2 (Figs. 1 and 2) made of insulating material and connected with each other by means of six pairs of longitudinal rods 3. Cheeks 1 and 2 are mounted on a shaft 4 rotatably supported by appropriate bearings. Shaft 4 carries a Maltese cross 5 having six arms and cooperating with a driving pinion 6 keyed on a shaft 7 driven at an appropriate speed by a motor not illustrated. It will be appreciated that under the action of pinion 6 the barrel-like support 1, 2, 3 rotates discontinuously, its motion comprising a rapid rotation through an angle of 60° followed by a standstill. Each pair of rods 3 thus passes through six different successive positions.

Between the two rods of each pair of rods 3 there is disposed a screw 8 rotatably supported by cheeks 1 and 2 but axially maintained therebetween. This screw projects beyond cheek 2 and on the projecting portion is keyed a toothed gear 9. On each screw 8 there is disposed a carriage 10 (Figs. 3 and 4) which engages the screw-threads as a nut, the said carriage having forked lugs 10a in slidable engagement with rods 3 to ensure guiding of the carriage which is thus prevented from rotating on the screw. Each carriage 10 is made of insulating material and its lateral faces are provided with light springs 11 which bear against rods 3 to form electric contact brushes. Each rod 3 is besides electrically connected with a contact 12 (Fig. 5) disposed on the periphery of cheek 1, such contact being provided with a lateral lug bent against the outer face of the cheek and through which the rod 3 under consideration is passed in such a manner that the said lug is clamped under the end nut of rod 3. It is appreciated that it is thus possible to connect each carriage 10 with an appropriate electric circuit for each position of standstill of the support or barrel 1, 2, 3 by means of fixed brushes.

Each carriage 10 carries a transverse pin 13 (Fig. 4) on which are pivoted two lateral lugs 14 in one with an arm 15 provided at its outer end with a rounded printing point 16, the arrangement being such that arm 15 moves in a plane substantially passing through the axis of the barrel support. The lateral lugs 14 extend each side of the narrow portion of carriage 10 which carries pin 13 (Figs. 3 and 4) and their outer ends support a transverse stay 17 through which is passed a rod 18 the end of which enters a small coil 19 disposed within a magnetic armature 20. Rod 18 carries an iron disk 21 which forms a movable armature in front of the open end of the fixed armature 20. A light spring 22 is disposed under arm 15 and acts on the portion of the latter situated beyond pin 13 to normally maintain the said arm at the inoperative position of Figs. 3 and 4. Coil 19 has its ends connected with springs or brushes 11 and one of the latter is besides connected with a small blade 23 transversely fixed on the outer face of carriage 10, its free end carrying a rounded contact 24. As illustrated in Figs. 1 and 5 blades 23 are curved in such a manner that contacts 23 are substantially exterior to the outer circular profile of carriages 10.

A rectilinear potentiometer 25 (Fig. 1) is disposed close to the barrel or support 1, 2, 3 in parallel relation to the axis of the barrel. This potentiometer may be formed for instance of a rod of insulating material whereon there is regularly wound a resistance wire. This potentiometer is so fixed to the frame of the apparatus that for each position of standstill of the barrel the contact 24 of one of the carriages 10 may bear against the periphery of the potentiometer as clearly shown in Fig. 5. In order to simplify the subsequent explanations this position of standstill of carriages 10 will be referred to as position A (Fig. 1). The frame of the apparatus besides supports a gear wheel 26 which is so disposed on one side of barrel 1, 2, 3 that it meshes with the gear 9 corresponding to the carriage 10 which is at position A. The teeth of wheel 26 are as sharp as possible to avoid any jamming and the arrangement is such that the said wheel 26 does not prevent rotation of the barrel. Wheel 26 is driven by an appropriate servo-motor adapted to ensure positioning of the successive carriages as thereafter explained.

Referring to Fig. 1 it will be seen that after position A each carriage reaches a second position B in front of which there is disposed an auxiliary barrel also comprising two end cheeks made of insulating material and connected with each other by means of longitudinal rods. One of these end cheeks is shown at 27 in Fig. 1. This auxiliary barrel comprises six longitudinal rods 28 each slidably carrying a metal carriage 29 (Figs. 1 and 6) provided with a threaded hole through which there is passed a screw 30 rotatably carried by the end cheeks without any noticeable axial play. Each screw 30 is provided with an actuating knob 31. As shown in Fig. 6 one of the two cheeks carries on its periphery a metal ring 32 electrically connected with all the rods 28. This auxiliary barrel 27, 28 is so disposed that the contact 24 of the carriage 10 at standstill at position B may bear against one of carriages 29 if the longitudinal positions of both carriages are in registration and assuming the auxiliary barrel is at standstill at the proper position.

The auxiliary barrel 27, 28 is carried by a shaft 33 provided with a gear 34 (Fig. 1), the latter meshing with an intermediate gear 35 which is in turn in mesh with a gear 36 carried by the shaft 4 of the main barrel. Gears 34 and 36 have the same number of teeth whereby the auxiliary barrel 27, 28 rotates exactly as the main barrel 1, 2, 3. It is thus possible to obtain that to each carriage 10 of the main barrel there corresponds a carriage 29 of the auxiliary barrel.

A second auxiliary barrel is disposed in front of the next position C of the carriages 10 of the main barrel, this second auxiliary barrel being formed of two cheeks 37 connected by means of six rods 38 carrying a tubular layer 39 of an absorbent material such as felt, for instance, the said layer being adapted to be impregnated with ink, as hereafter explained. The shaft 40 of this second barrel carries a gear 41 which meshes with the above-described intermediate gear 35. Here also gear 41 has the same number of teeth as gear 36 of shaft 4 whereby the auxiliary barrel 37, 38 rotates exactly as the main barrel 1, 2, 3, a layer 39 thus corresponding to each carriage 10 of the latter.

The paper chart 42 (Fig. 1) is disposed in front of the fourth position D of carriages 10. This paper is transparent whereby the dots printed on the back side of the chart may be seen through the paper itself. The paper chart is in the form of a band which comes from an upper roller 43, passes over a guiding surface 44 having a window in front of position D of the main barrel and is wound on a lower roller not illustrated. A transparent plate 45 of ground glass, metacrylic resins, &c. is disposed in front of the aforesaid window to support the paper band during the printing operation. Plate 45 may be provided with an appropriate scale.

The fifth and sixth positions E and F are of no interest whatever.

The apparatus described also comprises a shaft 46 (Fig. 1) carrying a number of cams 47 actuating electric contact switches 48. Shaft 46 is connected with shaft 33 of the first auxiliary barrel 27, 28 by means of gears 49, 50 having the same number of teeth.

The driving pinion 6 of the Maltese cross gear carries a lateral gudgeon 51 which actuates an electric switch 52.

A graduated scale 53 is disposed along the first auxiliary barrel 27, 28 to enable the operator to adjust the longitudinal position of carriages 29.

Fixed brushes are associated to the cheek 1 of the main barrel for cooperation with contacts 12 for some of the positions of carriages 10. For position A (Fig. 5) there is provided a single brush 54 adapted to cooperate with the contact 12 corresponding to the rod 3 on which slides the spring 11 (Fig. 3) connected with coil 19 and with contact 24. For position B also there is provided a single brush 55 which bears against the contact 12 corresponding to the common terminal of the coil and of the outer contact of the carriage 10. For positions C and D two brushes are provided, respectively 56 and 57.

For a clear understanding of the operation of the apparatus described it has been assumed in Fig. 7 that the six magnitudes to be recorded were temperatures measured by means of six thermocouples 58 (Fig. 7). These six couples are selectively connected with the measuring circuit by means of electric switches 48 (see Fig. 1) each couple corresponding to a given carriage at standstill at position A. In the simplified diagram of Fig. 7 it has been assumed that each couple was directly connected by the corresponding switch 48 with a two-way relay 59 having its other terminal connected with brush 54 corresponding to the said position A. The potentiometer 25 is connected across a cell 60 or other appropriate low voltage direct current source. The common terminal of thermo-couples 58 is connected with one end of potentiometer 25. Relay 59 controls rotation in either direction of an electric motor 61 which drives the above-described gear wheel 26.

Considering a carriage 10 at position A (Fig. 7) it will be appreciated that relay 59 is actuated in one direction or in the other according to the longitudinal position of the corresponding contact 24 along potentiometer 25 and according to the temperature measured by the corresponding thermo-couple 58. Motor 61 is so connected that through gears 26 and 9 and through screw 8 it tends to bring back the carriage to the neutral position for which the voltages applied to relay 59 balance each other. By combining appropriate amplifiers with relay 59 a high degree of accuracy may thus be obtained in the positioning of carriage 10 along its guides. It will be noted that at this position A coil 19 remains inactive.

The carriage 10 which has thus been positioned longitudinally in accordance with the temperature measured by the corresponding thermo-couple 58 then reaches position B. The fixed brush 55 corresponding to this position is selectively connected by switches 48 with an electric signal bulb 62. The circuit of bulbs 62 comprises the sliding contact 24 of the carriage 10 under consideration, the corresponding carriage 29 of the first auxiliary barrel 27, 28, the outer ring 32 thereof and a fixed brush 63 bearing on the said ring. If the longitudinal position of carriage 10 is such that contact 24 bears against carriage 29, bulb 62 is lighted. It will be understood that carriage 29 may be so adjusted that bulb 62 is only lighted when a predetermined temperature has been reached. Means may be provided to actuate another kind of signal.

For instance bulbs 62 may be replaced by relays actuating any appropriate apparatus. It will be observed that coil 19 still remains inactive.

Carriage 10 then reaches position C. The two brushes 56 corresponding to this position now bear on the two corresponding contacts 12 (Fig. 9). These two brushes are in a circuit which is controlled by the contact switch 52 actuated by the pinion 6 of the Maltese cross gear (see Fig. 1). This circuit is thus closed during a relatively short time whereby coil 19 is energized. Referring to Figs. 3 and 4 it will be appreciated that rod 18 is attracted and that arm 15 is rotated. The printing point 16 thus strikes the layer 39 (Fig. 1) corresponding to the carriage 10 under consideration, which layer has been impregnated with a coloured ink. The corresponding contact 24 remains inactive.

Carriage 10 now reaches position D (Fig. 9). The brushes 57 corresponding to this position are connected in parallel with the brushes 56 of position C. Arm 15 will therefore also be actuated and its printing point 16 will print a dot on the back side of the paper chart in front of the transparent plate 45.

From the preceding explanations it results:

(1) That each carriage prints on the chart a series of dots;

(2) That the carriages of the main barrel print these dots in succession, in such a manner that neglecting the duration of a cycle, it may be said that the six curves are printed simultaneously, eventually in six different colours;

(3) That since each carriage only corresponds to one single magnitude, the displacement of this carriage at position A only corresponds to the variation of this magnitude during a cycle of operation of the apparatus and is therefore very small in most cases, whereby the time necessary to position the carriage may be very short;

(4) That the successive operations of positioning longitudinally a carriage, of feeling same to detect any abnormal value of the corresponding magnitude, of inking the printing point, and of printing a dot on the chart, take place at the successive positions of the carriage under consideration, the time of standstill of the main barrel between two successive rotations being only determined by the longest one of these operations and not by the total of their individual durations;

(5) That the front side of the chart is always quite free and unobstructed by any kind of pen, printing arm or the like.

In the modification of Fig. 10 wheels 9 and 26 do not mesh with each other in contradistinction to what is shown in Fig. 1. There is provided an intermediate gear 63a loose at the end of an arm 64 itself loosely mounted on the shaft 65 which carries the driving wheel 26. Arm 64 is in one with another arm 66 loaded by a spring 67 which normally maintains the said arm against an abutment 68. This arrangement avoids any risk of jamming even if the tips of the teeth are not particularly sharp, since the intermediate gear 63a may be pushed aside by gear 9 until the teeth come into proper meshing engagement.

It will be observed that when a gear 9 comes into mesh with gear 63a (or with gear 26 in the arrangement of Fig. 1) a small rotation of this gear 9 must take place since gear 26 remains at standstill. But this rotation has a negligible influence on the longitudinal position of the corresponding carriage 10 and moreover it is thereafter corrected by the positioning device described with reference to Fig. 7. A similar rotation of gear 9 takes place when the said gear is disengaged from gear 26 or 63a, but this small rotation is quite the same for all the successive carriages and it may be taken into account on the scale associated to the transparent front plate 45.

It is sometimes desired that the position of the successive carriages may be ascertained from a relatively long distance. This may be obtained by the device illustrated in Figs. 11 and 12. Each carriage 10 carries a reflecting prism 69 which, when the carriage is at position D (printing position) receives a beam of light rays parallel to the axis of the main barrel 1, 2, 3 and reflects the same towards the paper chart 42. The beam may come from an electric bulb 70 combined with a lens 71 and with a spherical reflector 72. There is thus produced on the paper chart a luminous spot which may be coloured and shaped at will by inserting an appropriate screen in front of the reflecting prism.

I claim:

1. Apparatus for recording on the same chart a plurality of magnitudes, comprising a rotatable support; a plurality of rectilinear guiding means regularly disposed on said rotatable support; carriages movable on said guiding means; means to impart to said rotatable support such an intermittent rotary motion that the guiding means corresponding to each of said carriages successively assume a number of definite positions; means to successively position each of said carriages on the corresponding guiding means in accordance with the value of one of the magnitudes to be recorded; printing means on each of said carriages; a chart movable close to a first one of the successive positions of said guiding means, in a plane parallel to the rectilinear direction of said guiding means when same are at said last-named position and transversely with respect to said direction; and means to actuate said printing means of each successive carriage in relation with said chart whenever the guiding means of this carriage are at said first position.

2. In an apparatus as claimed in claim 1, said means to successively position the successive carriages comprising a fixed rectilinear potentiometer disposed in the vicinity of a second one of the successive positions of said guiding means in parallel relation to the direction of said guiding means at said second position; a contact on each of said carriages, said contact being adapted to cooperate with said potentiometer when the guiding means of the corresponding carriage are at said second position; and means to move said last-named carriage until balanced conditions are obtained in an electric measuring circuit including said potentiometer between a standard electric source and a voltage corresponding to one of the magnitudes to be recorded.

3. In an apparatus as claimed in claim 1, said printing means on each individual carriage comprising a swingable arm; a printing point at the free end of said arm; elastic means to maintain said arm at an inactive position; electromagnetic means to actuate said arm; and switch means energizing said electromagnetic means whenever the guiding means of the corresponding carriage are at said first position.

4. In an apparatus as claimed in claim 1 said movable support being in the form of a barrel and said guiding means being parallel to the axis of rotation of said barrel.

5. Apparatus for recording on the same chart a plurality of magnitudes, comprising a main rotatable support; a plurality of rectilinear guiding means regularly disposed on said support; carriages movable on said guiding means; means to impart to said support such as an intermittent rotary motion that the guiding means corresponding to each of said carriages successively assume a number of definite positions; means to successively position each of said carriages on the corresponding guiding means in accordance with the value of one of the magnitudes to be recorded; printing means on each of said carriages; a chart movable close to a first one of the successive positions of said guiding means, in a plane parallel to the rectilinear direction of said guiding means when same are at said first position and transversely with respect to said direction; means to actuate said printing means of each successive carriage in relation with said chart whenever the guiding means of this carriage are at said first position; an auxiliary rotatable support disposed adjacent a second position of said guiding means; means to impart to said auxiliary support the same intermittent rotary motion as said main support and in unison therewith; rectilinear inkers carried by said auxiliary support, said inkers being equal in number to said carriages and being so disposed on said auxiliary support that for each rotation of said main and auxiliary rotatable supports one of said inkers extends in parallel and close relation with those of said guiding means which are at said second position; and means to cause the printing means of the carriage corresponding to said last-named guiding means to come into contact with said last-named inker to be inked thereby.

6. Apparatus for recording on the same chart a plurality of magnitudes, comprising a main rotatable support; a plurality of rectilinear guiding means regularly disposed on said support; carriages movable on said guiding means; means to impart to said support such an intermittent rotary motion that the guiding means corresponding to each of said carriages successively assume a number of definite positions; means to successively position each of said carriages on the corresponding guiding means in accordance with the value of one of the magnitudes to be recorded; printing means on each of said carriages; a chart movable close to a first one of the successive positions of said guiding means, in a plane parallel to the rectilinear direction of said guiding means when same are at said first position and transvesrely with respect to said direction; means to actuate said printing means of each successive carriage in relation with said chart whenever the guiding means thereof are at said first position; an auxiliary rotatable support disposed adjacent a second position of said guiding means; means to impart to said auxiliary support the same intermittent rotary motion as said main support and in unison therewith; carriages adjustable on said auxiliary support; rectilinear guiding means for said last-named carriages, so disposed on said auxiliary support that for each rotation of said auxiliary support the guiding means of each of said last-named carriages extend in parallel and close relation with the guiding means of one of the carriages of said main support when said last-named guiding means are at said second position, each carriage of said auxiliary support thus corresponding with one carriage of said main support; and contact means to close an electric circuit between each carriage of said auxiliary support and the corresponding carriage of said main support when the guiding means of the latter are at said second position and when said last-named carriage is at a given longitudinal position on said last-named guiding means.

7. Apparatus for recording on the same chart a plurality of magnitudes, comprising a frame; a support rotatably carried by said frame; a plurality of rectilinear guiding means regularly disposed on said support; carriages movable on said guiding means; means to impart to said support such an intermittent rotary motion that the guiding means corresponding to each of said carriages successively assume a number of definite positions; displacing means on said support to move longitudinally each of said carriages along its guiding means, said displacing means embodying for each carriage a gear wheel rotatably carried by said support; a pinion rotatably carried by said frame and so disposed thereon as to come into mesh with each of said gear wheels when the guiding means of the corresponding carriage are at said first position; a servo-motor to drive said pinion; potentiometer means to feel the position of each carriage when the guiding means thereof are at said first position; electric means to control said servomotor to cause same to rotate in such a direction as to position the carriage corresponding to those of said guiding means which are at said first position in accordance with one of the magnitudes to be recorded; printing means on each of said carriages; a chart movable close to a second one of said successive positions of said guiding means, in a plane parallel to the rectilinear direction of said guiding means when same are at said second position and transversely with respect to said direction; and means to actuate said printing means of each successive carriage in relation with said chart whenever the guiding means thereof are at said second position.

8. Apparatus for recording on the same chart a plurality of magnitudes, comprising a frame; a support rotatably carried by said frame; a plurality of rectilinear guiding means regularly disposed on said support; carriages movable on said guiding means; means to impart to said support such an intermittent rotary motion that the guiding means corresponding to each of said carriages successively assume a number of definite positions; displacing means on said support to move longitudinally each of said carriages along its guiding means, said displacing means embodying for each carriage a gear wheel rotatably carried by said support; a first pinion rotatably carried by said frame; a second pinion in meshing engagement with said first pinion, said second pinion being carried by an arm pivoted about the axis of said first pinion; spring means to maintain said second pinion at such a position that it comes into mesh with each of said gear wheels when the guiding means of the corresponding carriage are at said first position; a servo-motor to drive said first pinion; potentiometer means to feel the position of each carriage when the guiding means thereof are at said first position; electric means to control said servomotor to cause same to rotate same in such a direction as to position the carriage corresponding to those of said guiding means which are at said first position in accordance with one of the magnitudes to be recorded; printing means on each of said carriages; a chart movable close to a second one of said successive positions of said guiding means, in a plane parallel to the rectilinear direction of said guiding means when same are at said second position and transversely with respect to said direction; and means to actuate said printing means of each successive carriage in relation with said chart whenever the guiding means thereof are at said second position.

9. Apparatus for recording on the same chart a plurality of magnitudes comprising a frame; a barrel rotatably supported by said frame; guiding means longitudinally disposed on said barrel in regular respective relation; carriages movable on said guiding means; printing means on said carriages; means to impart to said barrel such an intermittent rotary motion that the guiding means corresponding to each of said carriages successively assume a number of definite positions with respect to said frame; means to successively position each of said carriages on its guiding means in accordance with one of said magnitudes when said last-named guiding means are at a first one of said positions; means to ink said printing means of each successive carriage when the guiding means thereof are at a second one of said positions; a chart movable close to a third one of said positions in a plane parallel to the direction of those of said guiding means which are at said third position and transversely to said direction; and means to actuate said printing means of each successive carriage in relation with said chart whenever the guiding means thereof are at said third position.

References Cited in the file of this patent

UNITED STATES PATENTS

| 1,641,199 | Roucka | Sept. 6, 1927 |
|---|---|---|
| 1,660,921 | Fischer | Feb. 28, 1928 |
| 1,794,966 | Legg | Mar. 3, 1931 |
| 2,125,345 | Hunt | Aug. 2, 1938 |
| 2,191,673 | Moore | Feb. 27, 1940 |
| 2,291,475 | Kellogg et al. | July 28, 1942 |
| 2,542,475 | Caldwell | Feb. 20, 1951 |

FOREIGN PATENTS

| 512,340 | Great Britain | Apr. 5, 1939 |